(12) United States Patent
Bhuyan et al.

(10) Patent No.: US 12,120,109 B2
(45) Date of Patent: Oct. 15, 2024

(54) SYSTEMS, DEVICES, AND METHODS FOR AUTHENTICATING MILLIMETER WAVE DEVICES

(71) Applicants: Battelle Energy Alliance, LLC, Idaho Falls, ID (US); The Research Foundation for The State University of New York, Buffalo, NY (US)

(72) Inventors: Arupjyoti Bhuyan, Idaho Falls, ID (US); Zhi Sun, Clarence Center, NY (US); Sarankumar Balakrishnan, San Jose, CA (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 297 days.

(21) Appl. No.: 17/596,863

(22) PCT Filed: Jun. 26, 2020

(86) PCT No.: PCT/US2020/070192
§ 371 (c)(1),
(2) Date: Dec. 20, 2021

(87) PCT Pub. No.: WO2020/264575
PCT Pub. Date: Dec. 30, 2020

(65) Prior Publication Data
US 2022/0311762 A1   Sep. 29, 2022

Related U.S. Application Data

(60) Provisional application No. 62/868,062, filed on Jun. 28, 2019.

(51) Int. Cl.
*G06F 21/00* (2013.01)
*H04B 7/06* (2006.01)
*H04L 9/40* (2022.01)

(52) U.S. Cl.
CPC ....... *H04L 63/0861* (2013.01); *H04B 7/0617* (2013.01)

(58) Field of Classification Search
CPC ... H04L 63/0861; H04B 7/0617; H04B 7/024; H04W 12/122; H04W 12/79; H04W 84/12; H04W 12/06; H04W 16/28
See application file for complete search history.

(56) References Cited

U.S. PATENT DOCUMENTS

| | | | |
|---|---|---|---|
| 6,573,803 B1 | 6/2003 | Ziegner et al. | |
| 2012/0188929 A1* | 7/2012 | Zhang | H04B 7/0408 370/312 |

(Continued)

OTHER PUBLICATIONS

International Search Report from International Application No. PCT/US2020/070192, mailed Sep. 14, 2020, 2 pages.

(Continued)

*Primary Examiner* — Ghazal B Shehni
(74) *Attorney, Agent, or Firm* — TraskBritt (57) ABSTRACT

Systems, devices, and methods are described for millimeter wave device authentication. A system may include one or more access points. Each access point of the one or more access points is configured to extract, from one or more beam patterns generated via a client device, a beam feature associated with the client device. Each access point may also be configured to transmit the beam feature. The system may also include a server communicatively coupled to the one or more access points and including a database for storing known beam features. The server may be configured to receive the beam feature associated with the client device from at least one access point of the one or more access points. Also, the server may be configured to authenticate the client device in response to the received beam feature matching a known beam feature stored in the at least one database.

13 Claims, 5 Drawing Sheets

(56) References Cited

U.S. PATENT DOCUMENTS

| | | | |
|---|---|---|---|
| 2015/0103937 A1* | 4/2015 | Cudak | H04B 7/0695 |
| | | | 375/267 |
| 2016/0124071 A1 | 5/2016 | Baxley et al. | |
| 2016/0366586 A1* | 12/2016 | Gross | H04L 63/0876 |
| 2017/0214439 A1* | 7/2017 | Shtrom | H04B 7/0413 |
| 2017/0317724 A1* | 11/2017 | Khandani | H04B 7/043 |
| 2019/0059004 A1* | 2/2019 | Norita | H04B 7/0617 |

OTHER PUBLICATIONS

International Written Opinion from International Application No. PCT/US2020/070192, mailed Sep. 14, 2020, 5 pages.

\* cited by examiner

SYSTEMS, DEVICES, AND METHODS FOR AUTHENTICATING MILLIMETER WAVE DEVICES

CROSS-REFERENCE TO RELATED APPLICATIONS

This application is a national phase entry under 35 U.S.C. § 371 of International Patent Application PCT/US2020/070192, filed Jun. 26, 2020, designating the United States of America and published as International Patent Publication WO 2020/264575 A1 on Dec. 30, 2020, which claims the benefit under Article 8 of the Patent Cooperation Treaty to U.S. Patent Application Ser. No. 62/868,062, filed Jun. 28, 2019.

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

TECHNICAL FIELD

Embodiments of the present disclosure relate generally to physical layer security, and, more specifically, to authentication of millimeter wave devices. Yet more specifically, various embodiment relate to systems, devices, and methods for authenticating millimeter wave devices based on their unique physical layer characteristics. Further, some embodiments relate to radio-frequency (RF) fingerprints, electronic devices including RF fingerprints, and/or methods of inserting an RF fingerprint into a physical layer of an electronic device.

BACKGROUND

As technology continues to advance, wireless networks are becoming increasingly common in, for example, business environments, public environments, and home environments. Further, due to the sensitivity of data transmitted via a wireless network, authentication of a wireless device attempting to access a wireless network is of utmost importance.

BRIEF SUMMARY

One or more embodiments of the present disclosure include a system. The system may include one or more access points. Each access point of the one or more access points may be configured to extract, from one or more beam patterns generated via a client device, a beam feature associated with the client device. Each access point may also be configured to transmit the beam feature. The system may also include a server communicatively coupled to the one or more access points and including at least one database for storing known beam features. The server may be configured to receive the beam feature associated with the client device from at least one access point of the one or more access points. The server may further be configured to authenticate the client device in response to the received beam feature matching a known beam feature stored in the at least one database.

In one or more other embodiments, a system may include one or more client devices, wherein a physical layer of each client device of the one or more client devices has an inserted RF signature for generating a known beam pattern feature. The system may also include one or more access points, wherein each access point of the one or more access points is configured to extract a beam pattern feature of one or more beam patterns generated via a client device of the one or more client devices. The system may further include a server communicatively coupled to the one or more access points and including at least one database for storing the known beam pattern feature. The server may be configured to receive the beam pattern feature from at least one access point of the one or more access points. The server may also be configured to authenticate the client device in response to the received beam pattern feature matching the known beam pattern feature.

One or more embodiments of the present disclosure include a method. The method may include receiving at least one beam pattern generated via a millimeter wave (mmWave) device. The method may further include identifying a beam feature of the mmWave device based on the at least one beam pattern. Further, the method may include transmitting the beam feature to an authentication server.

In accordance with other embodiments, a method may include receiving, at an access point, at least one beam pattern generated via a client device. The method may also include extracting, from the at least one beam pattern, a beam feature associated with the client device. Further, the method may include transmitting the beam feature associated with the client device from the access point to an authentication server. Moreover, the method may include receiving, at the authentication server, the beam feature associated with the client device. In addition, the method may include comparing the beam feature associated with the client device to a number of known beam features for validated client devices. The method may also include authenticating, via the authentication server, the client device in response to the beam feature of the client device matching at least one known beam feature of the number of known beam features.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the disclosure. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present disclosure is defined only by the accompanying claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Millimeter wave (mmWave) frequencies generally refer to high frequency signals having wavelengths on the order of millimeters (mm). The mmWave frequency spectrum may include a band above 24 GHz. For example, the mmWave frequency spectrum includes bands between 24 GHz and 100 GHz, 24 GHz and 300 GHz, 30 GHZ and 300 GHz, or any other combination of frequencies including a range above 24 GHz.

Increasing demands for higher data rates and the availability of wide bandwidth at higher frequency spectrums makes mmWave communication attractive for next generation wireless systems. MmWave communication may be used in, for example, multi-Gigabit WLANs, 5G cellular networks, wireless displays, cable free connections, virtual reality devices, to name a few. The current 60 GHz WLAN IEEE standard 802.11ad and the upcoming standards, such as IEEE 802.11ay and 5G NR for cellular networks, use mmWave for communication.

With the proliferation of mmWave wireless communication, large amounts of data is, and will continue to be, transmitted wirelessly. It is estimated that by the year 2020 there will be approximately 38 billion connected devices with more than 60% of global mobile traffic through WiFi. The majority of this traffic will likely be driven by next generation mmWave wireless networks such as 802.11 ad/ay and 5G cellular networks. Thus, security is critical for mmWave wireless networks. Existing security protocols for wireless standards including mmWave are implemented at a software level, and are traditionally cryptographic based schemes (e.g., WPA and WPA2-PSK), which are vulnerable to sophisticated attacks (e.g., DoS attacks, injection attacks, spoofing attacks, and man-in-the-middle (MITM) attacks). These attacks may be harmful, especially when involving critical applications (e.g., involving emergency first responders, classified government departments (e.g., Department of Defense (DOD)), healthcare systems, power plants, and vehicle and/or mass transit systems, among others).

Current RF physical layer features are either 1) data dependent (e.g., transient and preamble based features that are prone to signal replay attack) or 2) low-dimensional (e.g., modulation based features that can be easily forged and have limited capacity in terms of number of devices that can be enrolled, which makes them weak and limited in practical usage). Further, conventional RF fingerprinting solutions are used in sub-6 GHz wireless technologies, and not mmWave devices.

Various embodiments of the disclosure are related to physical layer security. More specifically, various embodiments may include utilizing unique device dependent hardware features to identify and authenticate legitimate devices. These unique hardware features of a mmWave device may be due to, for example, manufacturing tolerances in an antenna array of the mmWave device, and these unique features may contribute to a beam pattern of a mmWave that is unique to the mmWave device. According to some embodiments, a unique beam pattern of a mmWave device may be used as a signature (e.g., an RF signature) to differentiate one mmWave device from other mmWave devices. Utilizing the unique characteristics of a mmWave device as a signature may be more effective than conventional solutions (e.g., using security keys) since the unique characteristics are much more difficult to imitate. Further, mmWave communication is inherently considered to be secure due to the directionality of the antenna beams, and attacks, such as MITM, are considered to be difficult. Various embodiments disclosed herein may be applicable wherever mmWave beams are used for wireless transmission. For example, various embodiments may be applicable to wireless networks, such as, for example only, 5G cellular networks and 802.11 ad/ay.

As will be described more fully herein, wireless waveforms transmitted by a device may be stamped with one or more unique features that originate in a physical layer of a transmitter of the device. The one or more unique features may be used to identify and/or authenticate devices. For example, such unique features may be generated by one or more imperfections along a hardware chain of a device transmitter (e.g., clock jitter, I/Q offset due to imbalance between I and Q branches, oscillators, synthesizer for up-conversion, a DAC sampling process, non-linearity of an amplifier, phase noise of phase shifters, and/or fabrication process tolerance inherent to antenna elements). These unique features in hardware are difficult to forge, unlike software-based security schemes. In some embodiments, the unique features may be used in conjunction with existing higher layer security mechanisms.

MmWave devices typically use a set of beam patterns, and an optimal beam pattern may be determined via a process known as beam searching. Movement of a device and/or a change in orientation of the device may expose different angular views of the beam patterns. This spatial-temporal characteristic of beam patterns used by a mmWave device may be used to determine one or more beam features of a beam generated by the mmWave device. In some embodiments, device dependent beam patterns may be learned and reliably employed for device identification. Device authentication, according to various embodiments disclosed herein, may be: 1) data independent (e.g., because a beam pattern does not depend on the signal being transmitted; 2) high dimensional; and 3) resilient to impersonation attacks.

In some embodiments, a process (also referred to herein as a "fingerprinting process") may authenticate a mmWave device based on a unique beam pattern generated by the mmWave device. More specifically, in some embodiments, a fingerprinting scheme with multiple access points (APs) may be used to take advantage of the rich spatial-temporal information of a beam pattern of a mmWave device. To exploit the rich spatial-temporal feature in a beam pattern sweep during a beam-searching phase, various embodiments may include a system including multiple APs for RF fingerprinting mmWave devices. Further, some embodiments relate to an optimal deployment strategy for the APs. Moreover, according to some embodiments, an authentication system may collect device data (e.g., RF data), and, via a neural network (e.g., a convolutional neural network (CNN)), the authentication system may be trained to identify and/or authenticate legitimate devices based on their unique beam patterns.

Additionally, other embodiments relate to a unique RF fingerprint and/or methods of inserting a unique RF fingerprint into a device (e.g., into a physical layer of mmWave device). More specifically, for example, various embodiments may relate to inserting a specific RF fingerprint into mission critical mmWave devices (e.g., for first responder networks, business network systems, hospital networks, and government networks (e.g., department of defense)). The RF fingerprint may cause the mmWave device to generate a known and detectable beam pattern having a known beam feature. In these embodiments, for example, a number of individuals (e.g., employees of a company, hospital employees, DOD employees, emergency responders) may be provided a device (e.g., laptop, tablet, mobile telephone, etc.) that includes a unique RF fingerprint that allows the individuals to access a network (e.g., employer network, hospital network, emergency responder network). Thus, each individual (e.g., each employee of a hospital) may have a device including the same RF fingerprint (i.e., in a physical layer) that allows the device to access a secure network based on a specific beam pattern, generated by the device, and dependent on the RF fingerprint. Devices without the RF fingerprint may not be able to generate the specific beam pattern, and thus these devices may not access the secure network.

Figure 1:
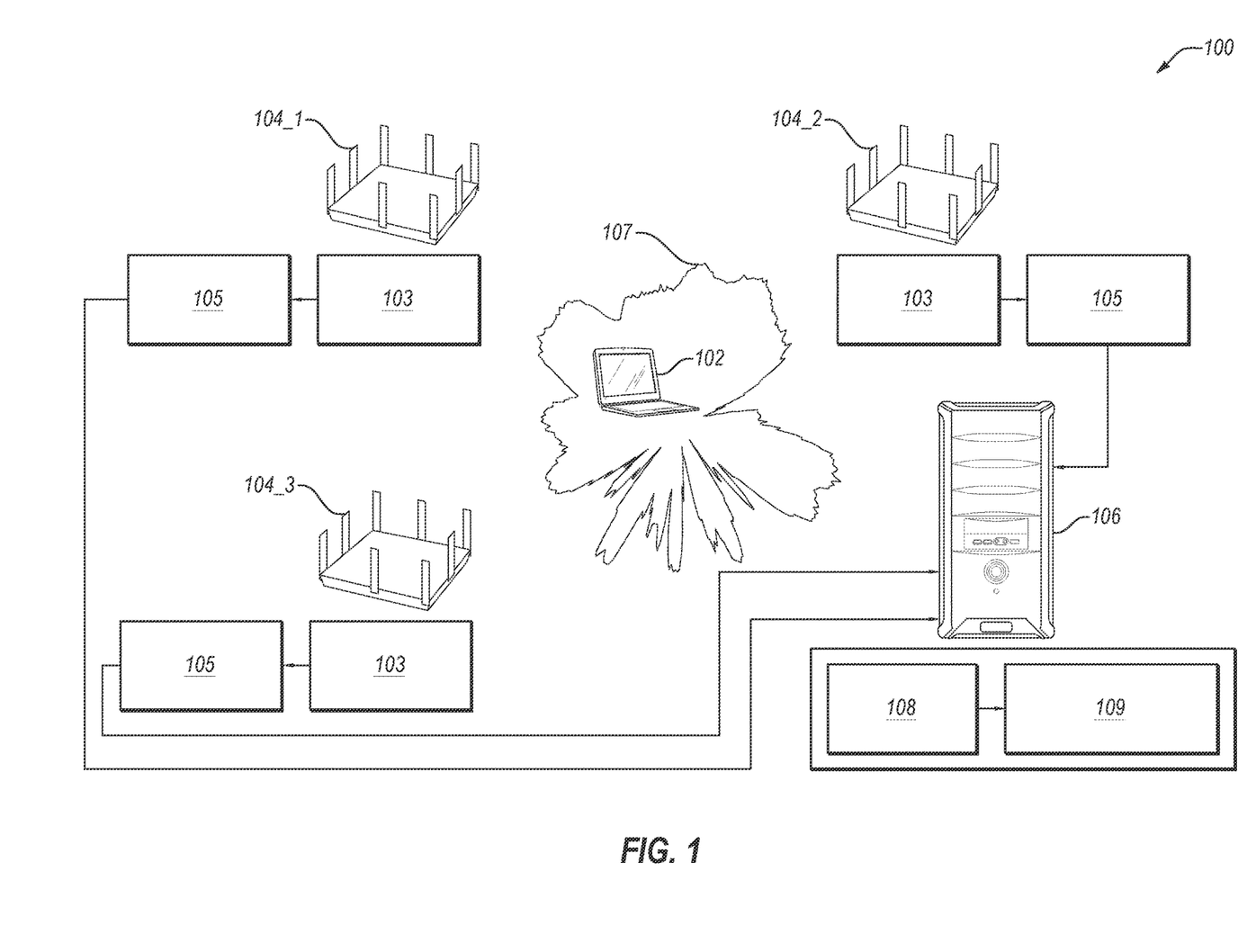
FIG. 1 depicts an example authentication system, according to various embodiments of the disclosure.

In these embodiments, a beam pattern generated by a device including the unique RF fingerprint may be known to an authentication system (e.g., an authentication server, such as server 106 of FIG. 1). Thus, in these embodiments, it may not be necessary for a classification process and/or a training process to classify and/or learn beam patterns generated by legitimate devices. For example, an RF fingerprint may be built into a device during device manufacture, or the device may be retrofitted with an RF fingerprint.

Various embodiments described herein may mitigate attacks and enhance the security of wireless communication systems. For example, various embodiments may exhibit high identification accuracy (e.g., under stationary LOS and NLOS scenarios) compared to conventional authentication systems. Moreover, some embodiments disclosed herein may not require additional signal processing or hardware, as opposed conventional systems that may require complex signal processing and expensive hardware due to the high bandwidth of a mmWave signal.

Embodiments of the present disclosure are now explained with reference to the accompanying drawings.

FIG. 1 illustrates authentication system 100, according to various embodiments of the disclosure. Authentication system 100, which is configured to authenticate a client device (e.g., a mmWave device) 102, includes access points (APs) 104 (shown as AP 104_1, AP 104_2, and AP 104_3 in FIG. 1) and a server (e.g., backend server) 106. As described more fully herein, authentication system 100 may be configured to authenticate client device 102 via a beam pattern 107 generated by client device 102. As will be understood, authentication system 100 may include an autonomous, non-intrusive authentication system. Although only one client device is shown in FIG. 1, authentication system 100 may be configured to authenticate any number of client devices. Each access point 104 may include, for example, a processor 103 and/or a feature extraction module 105. Although three access points are shown in FIG. 1, an authentication system may include any number of access points (e.g., 1, 2, 5, 10, or more). As will be appreciated, in at least some embodiments, one or more access points APs may include a 5G base station.

For example, APs 104 may be coupled to server 106 via a backhaul network or Gigabit Ethernet or may be a part of a Multi Access Edge Computing (MEC) in a 5G cellular network. Further, as shown in FIG. 1, server 106 includes a beam pattern feature database 108 and a classification and identification module 109. According to various embodiments, server 106 may be configured to perform an algorithm (a "classification and identification algorithm") to authenticate a client device (e.g., client device 102).

In some embodiments, APs 104 and client device 102 may be configured for communication via, for example, a mmWave standard (e.g., 802.11ad). APs 104 and client device 102 may perform beam searching to establish directional communication with each other. APs 104 may extract a beam pattern feature of a beam transmitted by client device 102 during the beam searching phase (e.g., in the mmWave standards such as 802.11ad, 802.11ay, and 5G NR), which may not introduce any additional protocol and signal processing overhead. As noted below, in some embodiments, one or more APs 104 may be positioned within a deployment area to maximize signal coverage probability.

According to some embodiments, authentication system 100 may operate in a two-stage process: 1) a learning stage and 2) an identification stage. During the learning stage, client devices (e.g., client device 102) may be identified and beam pattern feature database 108 may be populated with identified client devices. For example, each client device 102 may be assigned an identifier Li, wherein i=1 . . . N, with N being the number of client devices. In some embodiments, APs 104 may initiate a beam searching process (e.g., sector level sweep in 802.11ad) periodically and/or in response to movement of at least one client device. Further, APs 104 may extract (e.g., measure) a beam pattern feature vector of a client device and communicate the identifier Li and the associated feature vector to server 106. For example, the learning stage may include a one-time process and may be completed before a client device is authenticated and admitted to authentication system 100. Server 106 may generate (e.g., build) a beam pattern feature database 108 for each enrolled client device. As described more fully below, server 106, and more specifically, classification and identification module 109, may perform various learning/training methods (e.g., via one or more neural networks).

During the identification stage, when a client device (e.g., client device 102) desires to join a network, the client device may perform beam searching with APs 104, and one or more APs 104 (e.g., each AP 104 in communication with the client device) may extract (e.g., measure) a beam pattern feature vector of the client device. The one or more APs 104 may transmit a beam pattern feature vector (also referred to as "beam feature" or "beam pattern feature") to server 106. Further, server 106, and, more specifically, classification and identification module 109, may verify the beam pattern feature against the feature of the client device stored in beam pattern feature database 108. More specifically, classification and identification module 109 may compare the beam pattern feature against known beam pattern features stored in beam pattern feature database 108. In response to the beam pattern feature matching as least one known beam pattern feature stored in beam pattern feature database 108, the client device may be authenticated.

As will be appreciated by a person having ordinary skill, a beam pattern of an antenna array is a function of the radiation field of individual antenna elements, amplitude and phase applied to each of the antenna elements, and the array geometry. Further, the beam pattern of an antenna array may also be affected by the manufacturing tolerances and/or manufacturing errors that arise due to masking, etching, and dielectric constant tolerances during antenna array fabrication. For example, one source of variation in a beam pattern may be due to antenna array fabrication and the dielectric properties of a substrate used in an antenna. The antenna patch resonance frequency may depend on the relative permittivity of the material used for the substrate. Another source of variation in the beam pattern is the dimensional tolerance of the antenna fabrication process. Manufacturing error may increase considerably at higher frequencies due to reduced antenna size and increasing substrate dielectric. Due to the shrinkage in dimension during the fabrication process and the errors that depend on the tolerance of the fabrication process, the final dimensions of the antenna may not be the same across different batches. Errors due to tolerances associated with antenna fabrication process as well as the phase shifters, introduce unique hardware dependent beam pattern variation among antenna arrays even with the same architecture and geometry.

Figure 2A:
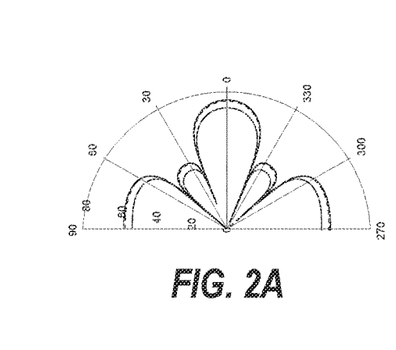
FIGS. 2A-2D illustrate example beam pattern variations.
Figure 2B:
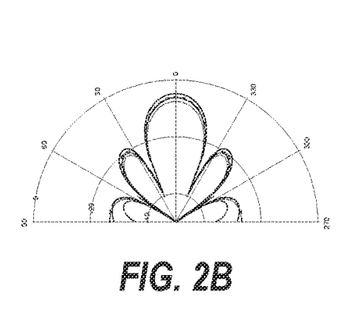
Figure 2C:
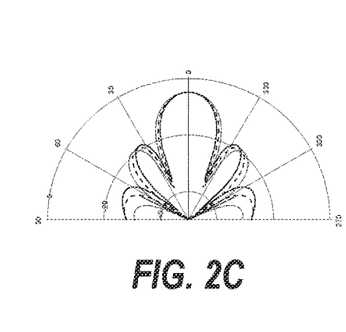
Figure 2D:
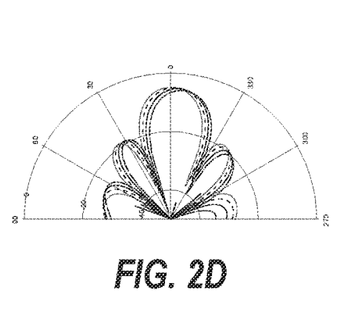

FIGS. 2A-2D shows beam pattern variations. More specifically, FIG. 2A shows beam pattern variations due to a substrate dielectric tolerance, FIG. 2B shows beam pattern variations due to dimension shrinkage, FIG. 2C shows beam pattern variations due to antenna element spacing variation, and FIG. 2D shows beam pattern variations due to phase shifter errors.

According to various embodiments, a beam pattern feature may be unique among devices and scalable. Further, the beam pattern feature may be invariant over time. As shown in FIG. 2, errors due to tolerances of an antenna manufacturing process and phase shifters result in variation of the beam pattern among different antenna arrays. For example, the variations may be as high as 3.2 dB. According to various embodiments of the disclosure, via classification, as described more fully below, unique beam pattern variations (e.g., among devices of same manufacturer and across manufacturers) may be learned with high accuracy.

As noted herein, uniqueness of a beam pattern feature among different antenna arrays with identical geometries and materials may be used for authentication. However, if a number of devices operating in an authentication system exceeds a capacity of the authentication system, the beam pattern features of devices may overlap, thus decreasing the accuracy of the authentication system. Therefore, it may be advantageous to consider a user capacity of an authentication system. For example only, the user capacity may depend on a maximum variation of a beam pattern and/or variables associated with one or more components of an authentication system. More specifically, for example, a resolution of digitizer of one or more receivers (e.g., one or more AP) may be factor is determining user capacity.

As disclosed herein, mmWave beam searching may allow an AP to obtain high dimensional beam pattern features from client devices. However, from a particular spatial position, each AP may only obtain a single angular view of each beam pattern used by a client device. Deploying multiple APs in an area may allow the APs to have multiple views of the beam pattern of the client device. However, if the APs are deployed too close to each other or deployed in a position with obstacles, the beam pattern feature obtained by an AP might not offer distinct information. Therefore, deployment positions of APs within a signal coverage area may be considered to optimize an authentication system. More specifically, for example, for a client device (e.g., a mobile or a stationary device) and one or more APs to successfully receive each other's beacon signals, the one or more APs may be deployed is positions to maximize the signal coverage probability.

As noted above, an AP 104 may extract (e.g., measure) a beam patter feature of a beam transmitted by a client device (e.g., a mmWave device). In some embodiments, a mmWave device may transmit beacons through each of its sectors with unique beam patterns. For example, a client device may transmit 32 different beam patterns in each of its 32 sectors during beam searching (e.g., via a sector level sweep (SLS) in 802.11ad standard). In this example, the SLS or beam searching process may be used to measure a beam pattern $f_\theta^k$ of the kth beam pattern. The client device may either initiate beam searching with the APs or respond to beam searching beacons from the APs, during which the client device transmits a beam pattern in one of its sectors. For example, a first AP may measure vector elements $f_{\theta 1,i}^k$, assuming $\theta_{1,i}$ is the orientation angle of the first AP with respect to the client device in global coordinate system. As the client device transmits every beam pattern, the first AP may measure vector elements $f_{\theta 1,i}^k$ for each beam pattern k and build a feature vector $F_{\theta 1,i}=[f_{\theta 1,i}^1, f_{\theta 1,i}^2, \ldots, f_{\theta 1,i}^K]$. Each element $f_{\theta 1,i}^k$ in the vector $F_{\theta 1,i}$ is contributed by a distinct angle $\theta_{1,i}$ in one of the beam patterns used by the client device during beam searching. When multiple APs are available (e.g., as shown in FIG. 3), each AP may have distinct view $\theta_{m,i}$ of the kth beam pattern, where m=1, . . . , M, with M being the number of APs, to form the feature vector $F_{\theta m,i}=[f_{\theta m,i}^1, f_{\theta m,i}^2, \ldots, f_{\theta m,i}^K]$; m=1, . . . , M.

For a stationary scenario (i.e., a client device is stationary) with fixed device orientation angle relative to the APs, a beam pattern feature vector $F_{\theta m,i}$ of the codebooks swept by the client device during the beam searching mechanism may not change with respect to the device-AP direction. In these embodiments, the APs may extract the beam pattern vector for the K codebooks over several beam searching periods and build the fingerprint database for the client device. However, if the client device moves or the orientation of the client device changes with respect to the APs, the beam pattern fingerprint database may need to be updated as the beam pattern feature vector may changes with change in orientation of the client device with respect to the APs. In some embodiments, to authenticate a client device, the beam pattern $f_\theta^k$ of the kth codebook for all feasible $\theta$ may be measured.

Figure 3:
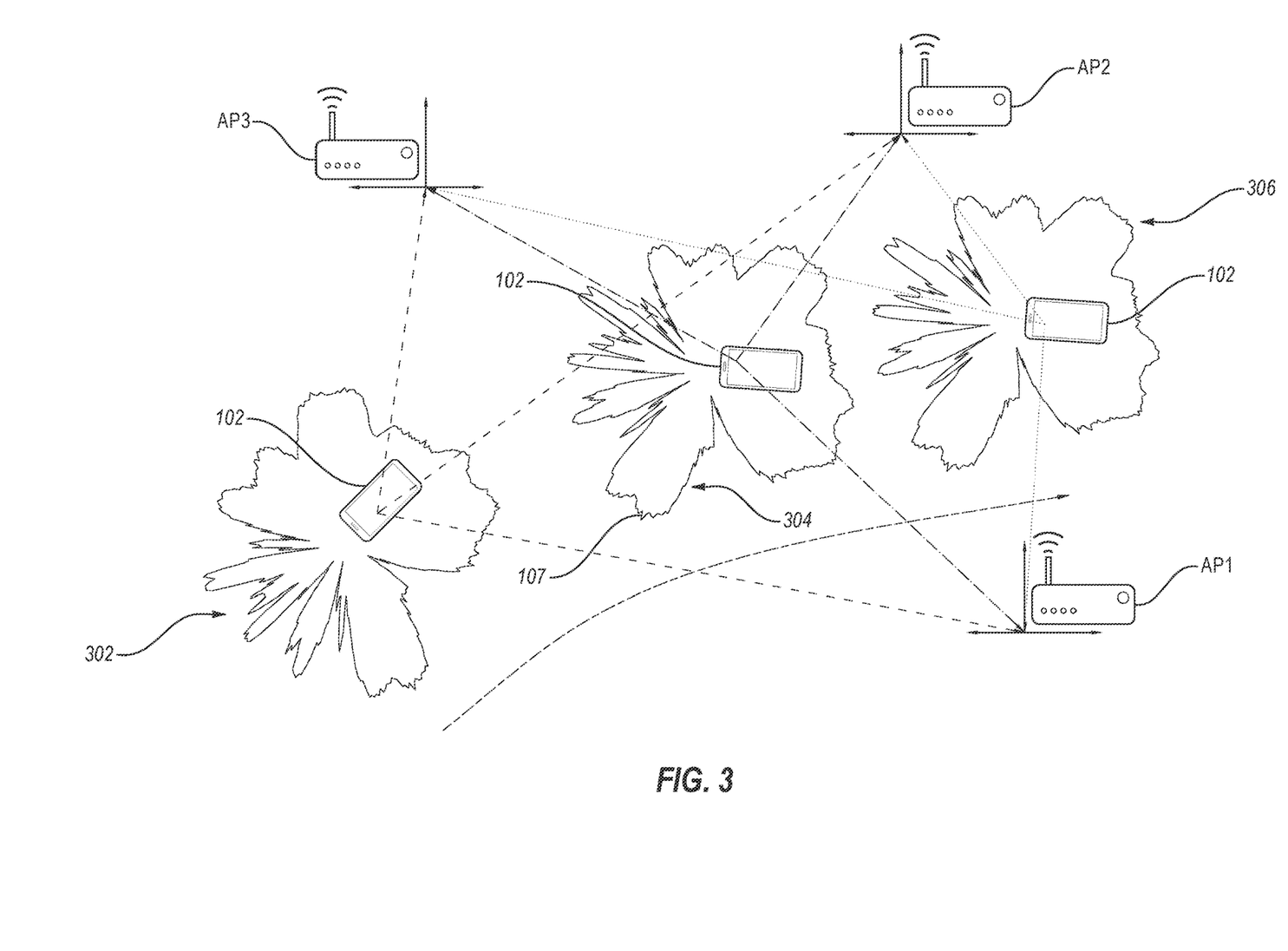
FIG. 3 shows an example beam pattern feature extraction via multiple access points, in accordance with various embodiments of the present disclosure.

When the client device moves or orientation changes, the angle $\theta_1$, of the kth codebook of the client device seen by an AP changes as shown in FIG. 3 (e.g., from a first position (as indicated by reference numeral 302) to another position (e.g., a second position indicated by reference numeral 304 or a third position indicated by reference numeral 306). A rotation of the client device by d degrees from initial orientation may result in beam pattern $f_{(\theta+d)}$ at the AP. In some embodiments, APs may learn distinct beam pattern points $f_{\theta m,i}^k$ for each of the k codebooks every time the client device moves and/or the orientation of the device changes.

Employing multiple APs (and client device mobility) may aid in learning the rich spatial features of the beam patterns used by client devices. In a single AP system, the AP may only use one distinct view of a user beam pattern for authentication, which makes the system vulnerable to impersonation attack. Using multiple APs may allow the APs to utilize multiple views of a beam pattern to authenticate a client device, thus improving the security of the system against impersonation attacks. However, multiple APs may increase the infrastructure cost of an authentication system.

In at least one embodiment, device mobility may be used to reduce cost and/or increase security of an authentication. For example, if a client device is mobile, a single AP may be sufficient. In this example, the single AP may wait until it is trained based on more distinct views (e.g., due to client device movement) in a beam pattern used by the client device. Thus, it may be hard for an attacker to know the number of views used by the AP for authentication.

Embodiments related to classification methods and systems will now be described. In some embodiments, a function or model that uniquely maps a beam pattern feature to its originating device may be generated and/or learned. For example, a mmWave device identification task may be modeled as a multi-class classification problem. In these embodiments, an input to a classifier may include beam patterns extracted during a beam searching process. Further, in this example, outputs may be corresponding class labels. For example, a classification system may include a neural network architecture. More specifically, for example, a 4 layer convolutional neural network (CNN) architecture may be used. In this example, a CNN may include two 1D convolutional layers and two dense layers with a rectifier linear unit (ReLu) activation function and a fully connected softmax layer. For example, the convolutional layers may include a filter size of 256 and 80, respectively, and may be initialized with, for example, a Glorot uniform initializer. The dense layers may be initialized with, for example, a He normal initializer. Further, for example, a categorical cross entropy loss function and an Adam solver may be used for training.

An input feature dimension to the neural network (e.g., the CNN) may be N×M×K, wherein N is the number of training samples, M is the number of APs, and K is the feature length. To reduce the effect of amplitude variations due to client device-AP distance, an input beam pattern feature vector may normalized. To train the neural network, beam pattern feature database 108 (see FIG. 1) may be randomly split into a training set and a validation set. Training may be validated using the validation set for each epoch of training. For example, an early stopping criterion may be utilized to stop the training when the validation loss does not minimize after, for example, 5 number of evaluations of the validation set.

Figure 4:
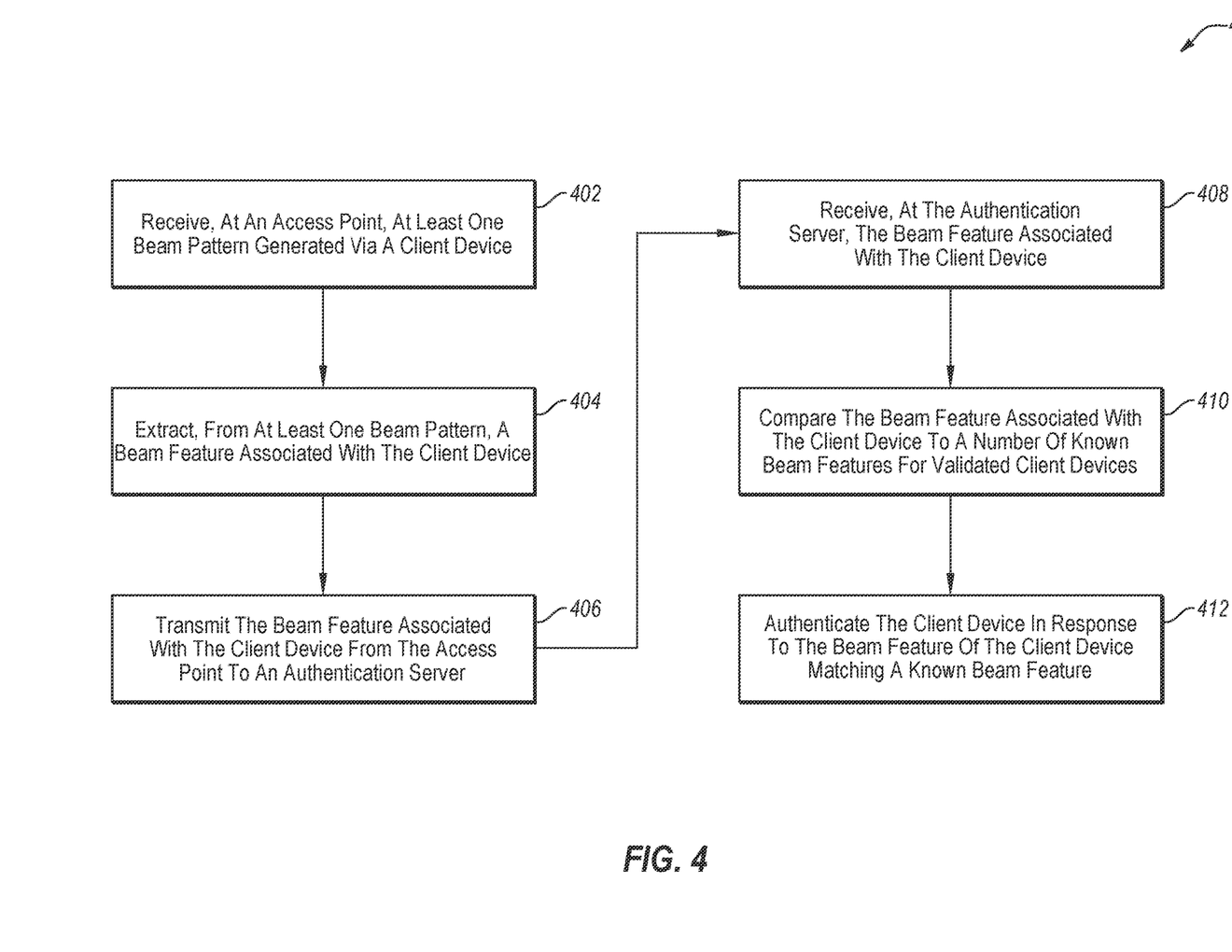
FIG. 4 is a flowchart of an example method of operating an authentication system, in accordance with various embodiments of the present disclosure.

FIG. 4 is a flowchart of an example method 400 of operating an authentication system, in accordance with various embodiments of the disclosure. Method 400 may be arranged in accordance with at least one embodiment described in the present disclosure. Method 400 may be performed, in some embodiments, by a device or system, such as authentication system 100 of FIG. 1 or another device or system. Although illustrated as discrete blocks, various blocks may be divided into additional blocks, combined into fewer blocks, or eliminated, depending on the desired implementation.

Method 400 may begin at block 402, where at least one beam pattern generated via a client device may be received, and method 400 may proceed to block 404. For example, the client device (client device 102 of FIG. 1) may include a mmWave device, and the at least one beam pattern (e.g., beam pattern 107) may be received at one or more access points (e.g., access points 104_1, 104_2, and 104_3 of FIG. 1).

At block 404, a beam feature associated with the client device may be extracted from the at least one beam pattern, and method 400 may proceed to block 406. For example, the one or more access points (e.g., access points 104 of FIG. 1) may extract (e.g., measure) the beam feature (e.g., a beam feature vector).

At block 406, the beam feature may be transmitted to an authentication server, and method 400 may proceed to block 408. For example, the beam feature may be transmitted from one or more access points (e.g., access points 104 of FIG. 1) to the authentication server (e.g., server 106 of FIG. 1).

At block 408, the beam feature may be received at the authentication server, and method 400 may proceed to block 410.

At block 410, the beam feature may be compared to a number of known beam features for validated client devices, and method 400 may proceed to block 412. For example, the beam feature may be compared to a number of known beam features stored in a database (e.g., beam pattern feature database 108 of FIG. 1) at the authentication server.

At block 412, in response to the beam feature matching at least one known beam feature, the client device may be authenticated. For example, the client device may be automatically authenticated in response to the client device being within communication range of an access point and the beam feature matching the at least one known beam feature.

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, in various embodiments, various classification operations, relating to training a neural network model, may be performed. More specifically, for example, a neural network (e.g., a CNN) model may be trained to determine a known feature for each client device of a number of client device. Further, the neural network model may be trained to identify and/or authenticate a client device based on a trained model.

Figure 5:
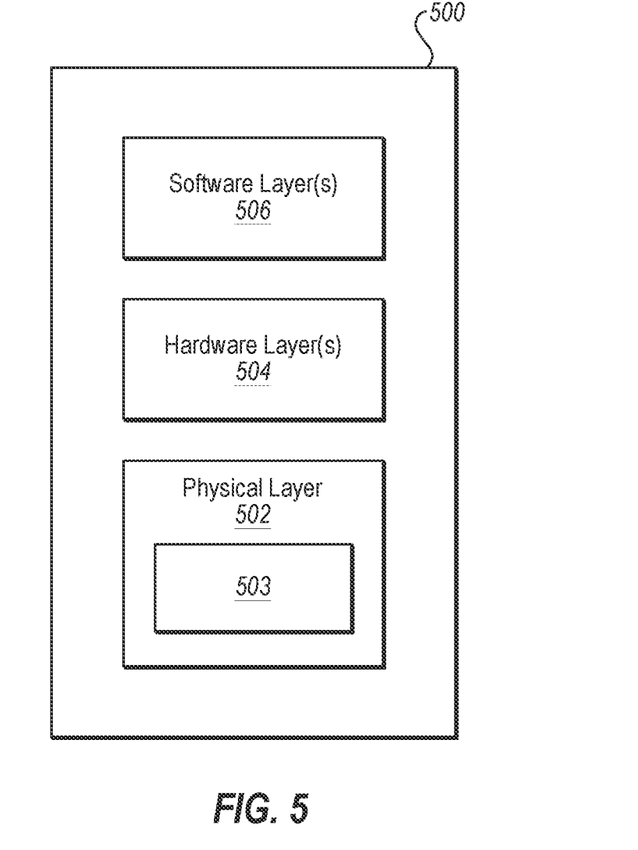
FIG. 5 is a block diagram of device including a fingerprint within a physical layer.

FIG. 5 is a block diagram of an electronic device 500, according to various embodiments of the disclosure. Electronic device 500 includes a number of layers, including a physical layer 502. According to some embodiments, physical layer 502 includes a fingerprint 503 (e.g., an RF signature). Fingerprint 503 may also be referred to herein as a "signature." For example, fingerprint 503 may be built into a device during device manufacture, or the device may be retrofitted with an RF fingerprint. The fingerprint may cause electronic device 500 to generate a known and detectable beam pattern having a known beam feature.

In addition to physical layer 502, electronic device 500 may include other hardware layers 504, such as a network layer and/or a datalink layer. Electronic device 500 may also include one or more software layers 506, which may include, for example, an application layer, a presentation layer, and/or a session layer.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure. Further, embodiments of the disclosure have utility with different and various detector types and configurations.

What is claimed is:

1. An authentication system, comprising:
   one or more access points, each access point of the one or more access points configured to:
     extract, from one or more beam patterns generated via a client device, a beam feature associated with the client device; and
     transmit the beam feature; and
   a server communicatively coupled to the one or more access points and including at least one database for storing known beam features, the server configured to:
     receive the beam feature associated with the client device from at least one access point of the one or more access points; and
     authenticate the client device in response to the received beam feature matching a known beam feature stored in the at least one database.

2. The authentication system of claim 1, wherein the server includes a classification and identification module configured to:
   train a classification model; and
   authenticate the client device based on the trained classification model.

3. The authentication system of claim 1, further comprising the client device, wherein a physical layer of the client device includes at least one RF fingerprint.

4. The authentication system of claim 3, wherein the client device is retrofitted with at least one RF fingerprint.

5. The authentication system of claim 1, wherein each access point is configured to extract the beam feature from a first beam pattern at a first angle and a second beam pattern at a second, different angle.

6. The authentication system of claim 1, wherein the client device comprises a millimeter wave device.

7. The authentication system of claim 1, wherein the client device and the one or more access points are configured to perform beam searching to establish communication.

8. A method, comprising:
   receiving, at an access point, at least one beam pattern generated via a client device;
   extracting, from the at least one beam pattern, a beam feature associated with the client device;
   transmitting the beam feature associated with the client device from the access point to an authentication server;
   receiving, at the authentication server, the beam feature associated with the client device;
   comparing, via the authentication server, the beam feature associated with the client device to a number of known beam features for validated client devices; and
   authenticating, via the authentication server, the client device in response to the beam feature of the client device matching at least one known beam feature of the number of known beam features.

9. The method of claim 8, further comprising inserting a unique RF fingerprint into a physical layer of the client device, the client device configured to generate the at least one beam pattern based on the unique RF fingerprint.

10. The method of claim 8, further comprising training a model to determine the number of known beam features of a number of client devices including the client device.

11. The method of claim 10, wherein authenticating the client device comprises authenticating the client device via the trained model.

12. An authentication system, comprising:
one or more client devices, a physical layer of each client device of the one or more client devices having an RF signature for generating a known beam pattern feature;
one or more access points, each access point of the one or more access points configured to extract a beam pattern feature of one or more beam patterns generated via a client device of the one or more client devices; and
a server communicatively coupled to the one or more access points and including at least one database for storing the known beam pattern feature, the server configured to:
receive the known beam pattern feature from at least one access point of the one or more access points; and
authenticate the client device in response to the received known beam pattern feature matching the known beam pattern feature.

13. The authentication system of claim 12, wherein the server is further configured to perform one or more learning methods to populate the at least one database with known beam features of the one or more client devices.

* * * * *

UNITED STATES PATENT AND TRADEMARK OFFICE
CERTIFICATE OF CORRECTION

PATENT NO. : 12,120,109 B2
APPLICATION NO. : 17/596863
DATED : October 15, 2024
INVENTOR(S) : Arupjyoti Bhuyan, Zhi Sun and Sarankumar Balakrishnan It is certified that error appears in the above-identified patent and that said Letters Patent is hereby corrected as shown below:

In the Specification

Column 9, Line 24, change "elements $f_{\theta 1,i}^{k}$, assuming" to --elements $f_{\theta 1,i}^{k}$, assuming--

Column 9, Line 28, change "elements $f_{\theta 1,i}^{k}$ for each" to --elements $f_{\theta 1,i}^{k}$ for each--

Column 9, Line 29, change "vector $F_{\theta 1,i} = [f_{\theta 1,i}^{1}, f_{\theta 1,i}^{2}, \ldots, f_{\theta 1,i}^{K}]$." to --vector $F_{\theta 1,i} = [f_{\theta 1,i}^{1}, f_{\theta 1,i}^{2}, \ldots, f_{\theta 1,i}^{K}]$.--

Column 9, Line 30, change "element $f_{\theta 1,i}^{k}$ in the" to --elements $f_{\theta 1,i}^{k}$ in the--

Column 9, Line 36, change "vector $F_{\theta m,i} = [f_{\theta m,i}^{1}, f_{\theta m,i}^{2}, \ldots, f_{\theta m,i}^{K}]$;" to --vector $F_{\theta m,i} = [f_{\theta m,i}^{1}, f_{\theta m,i}^{2}, \ldots, f_{\theta m,i}^{K}]$;--

Column 9, Line 63, change "points $f_{\theta m,i}^{k}$ for each" to --points $f_{\theta m,i}^{k}$ for each--

Signed and Sealed this
Tenth Day of December, 2024

Katherine Kelly Vidal
*Director of the United States Patent and Trademark Office*